Aug. 12, 1952 G. B. FORBES, JR 2,606,483
AUTOMATIC STACKING, COUNTING, AND TRANSFERRING APPARATUS
Filed Jan. 14, 1949 3 Sheets-Sheet 1

INVENTOR,—
GORDON B. FORBES JR.,
BY Joseph B. Gardney,
his ATTORNEY

Aug. 12, 1952     G. B. FORBES, JR     2,606,483
AUTOMATIC STACKING, COUNTING, AND TRANSFERRING APPARATUS
Filed Jan. 14, 1949     3 Sheets-Sheet 2

INVENTOR,—
GORDON B. FORBES JR.,
BY Joseph B. Gardner
his ATTORNEY

Aug. 12, 1952     G. B. FORBES, JR     2,606,483
AUTOMATIC STACKING, COUNTING, AND TRANSFERRING APPARATUS

Filed Jan. 14, 1949     3 Sheets-Sheet 3

INVENTOR,—
GORDON B. FORBES JR.
BY Joseph B. Gardner
his atty.

Patented Aug. 12, 1952

2,606,483

UNITED STATES PATENT OFFICE 2,606,483

AUTOMATIC STACKING, COUNTING, AND TRANSFERRING APPARATUS

Gordon B. Forbes, Jr., Oakland, Calif., assignor, by mesne assignments, to Benner-Nawman, Inc., Oakland, Calif., a corporation of California Application January 14, 1949, Serial No. 70,950

20 Claims. (Cl. 93—93)

The present invention relates to improved apparatus for the automatic stacking, counting and group transferring of articles delivered in a continuous flow thereto. More particularly, the present invention relates to apparatus for handling roofing shingles or similar slabs, and is especially suitable for use in carrying out the aforementioned operations in the handling of shingles coated with granular material and while the shingles are comparatively hot and extremely limber.

Apparatus designed in general for carrying out the above operations has been utilized in the mass production of roofing shingles and the like for many years. However, certain inherent shortcomings have been found to exist in presently available equipment, and the apparatus of the present invention has been designed to obviate these difficulties and provide for a smooth and efficient operation.

Apparatus commonly utilized for counting, stacking and transferring roofing shingles and the like, generally comprises a receiving unit to which the articles to be stacked are continuously delivered from a production machine, each article actuating a switch mechanism as the article enters the receiving unit whereby the latter is caused to descend a predetermined amount and thus maintain the top of the accumulated vertical stack of articles at a constant level substantially coinciding with the delivery path of the articles. When a predetermined number of articles have been delivered to the receiving unit, suitable mechanism is actuated whereby the stack is delivered bodily to a conveyor and thence advanced to a subsequent operating station for further handling or processing. In most types of apparatus presently in use, and including the apparatus of the present invention, the receiving or stack-sizing unit when filled to the desired level, drops sufficiently to deliver the stack to the takeaway conveyor, an auxiliary receiving unit automatically shifting into position meanwhile to support the following or succeeding articles being supplied to the stacker, the auxiliary unit shifting out of position again and simultaneously transferring its accumulated stack of articles to the primary or first receiving unit as the latter returns to position after transferring a completed stack to the conveyor.

One of the particular objections to prior commercially-employed equipment, especially when handling granule coated asphaltic shingles in a heated condition, is the fact that various moving parts of the machinery are adversely affected or rendered inoperative by reason of accumulations of disunited granules, from the shingles, this condition being commonly caused by the dragging action of shingles upon the trigger or detent of the actuating switch which is usually employed to count the delivered articles and to control the operation of the receiving unit. Another common difficulty is that the conveyor unit to which the stacks are delivered by the receiving unit inadequately supports the shingles, since the latter are normally delivered to the unit in a heated condition in which they are quite flexible and susceptible to sagging.

It is, therefore, a general object of the present invention to provide improved apparatus for the stacking, counting and group separation of roofing shingles, asphaltic tile, and the like articles, which are continuously delivered thereto, and particularly, adapted for use in carrying out these operations in the handling of heated asphaltic articles coated with granular aggregate or the like.

A further object of the invention is to provide automatic apparatus of the class described in which the moving parts thereof are designed and operated in such manner as to be either shielded from or kept free of the loose aggregate particles or so as to be unaffected thereby.

Another object of the invention is to provide apparatus of the class described capable of efficient operation at unusually high speeds.

An additional object of the invention is to provide improved and trouble-free actuating and control mechanism for the receiving unit whereby each phase of operation is accurately timed and controlled to take place in proper sequence.

A further object is to provide improved means which will convey the heated and limber shingles through the apparatus without sagging or deformation.

A still further object is to provide improved combination pneumatic and hydraulic control of movements of the receiving unit and associated mechanism whereby rapid, positive, and reliable operation of the apparatus is assured, together with automatic self-regulation in accordance with speed of delivery of articles to the machine.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawings and description may be adopted within the scope of the invention as set forth in the claims.

Figure 1:
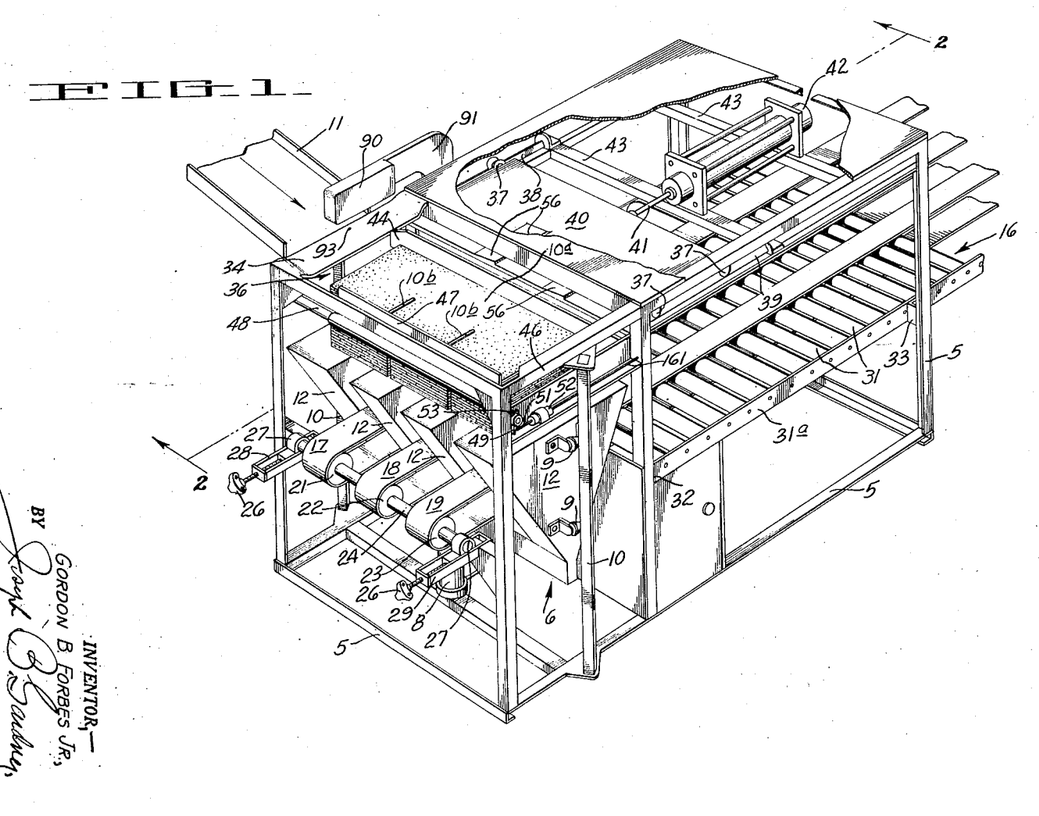
Figure 1 is a perspective view of shingle stacking and transferring apparatus of the present invention, with some parts broken away and other parts omitted for clearness of illustration.
Figure 2:
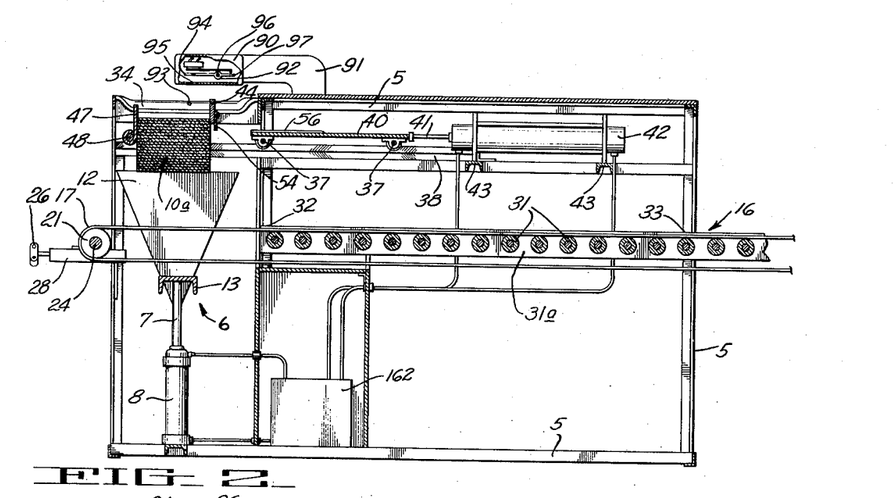
Figure 2 is a longitudinal vertical sectional view taken at line 2—2 of Figure 1 and showing diagrammatically the receiving unit in shingle-receiving position.
Figure 3:
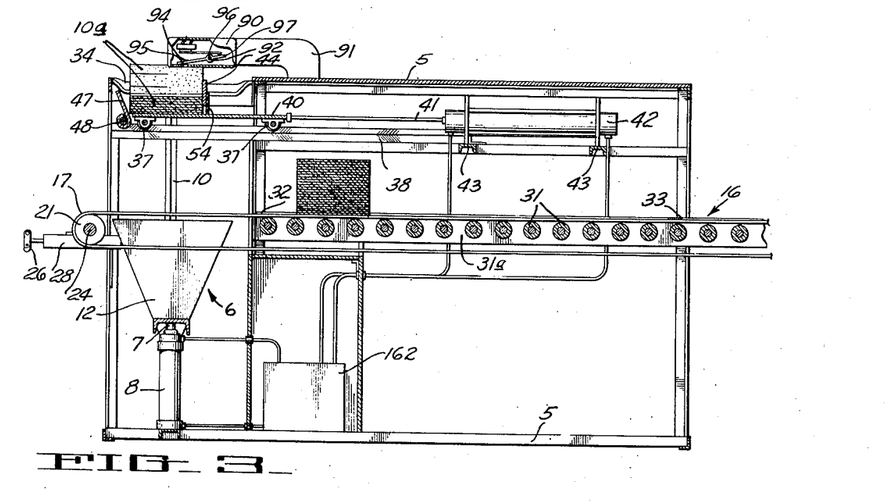
Figure 3 is a view similar to Figure 2 except that the receiving unit is shown in stack-transferring position.

The apparatus in the form illustrated in the drawings is particularly adapted for use with asphalt roofing shingles, and as shown in Figures 1, 2 and 3 includes a metal framework 5 which serves as a housing and support for the various elements of the apparatus. Arranged within the frame for vertically reciprocable movement is a shingle-receiving element 6 here shown carried by a vertically extending piston rod 7 of a double acting cylinder 8 containing a piston 4 (see Figure 4) and supported on a suitable cross member of the frame. Guide rollers 9 are mounted on opposite ends of the element 6 and engage vertical guide rods 10 fixedly attached to the frame.

The element 6 is positioned to receive shingles such as the shingles 10a as shown in Figure 1 from a chute 11, and, as will be more fully explained hereinafter, is caused to descend as the shingles become stacked thereon. In the form shown, the shingles 10a are provided with slots or notches 10b in their edges for dividing the shingles into sections. The shingles are arranged to be removed from the receiving element 6 when the latter reaches a bottom position, and as here shown the removal of the shingles from the receiving element is effected by means comprising a conveyor 16. In order to provide proper support for the shingles and to provide for the smooth and easy transfer of the shingles from the element 6 to the conveyor 16, the element 6 is designed in the form of a multiple part grid composed of a plurality of horizontally spaced grid sections 12 which are carried by a cross bar 13 affixed to the piston rod 7. The conveyor 16 is also formed in sections and comprises endless belts 17, 18, and 19 extending horizontally in the spaces between the grid sections and mounted upon sets of pulleys 21, 22, and 23 fixedly carried on a shaft 24. In the drawings, but one set of the pulleys is illustrated, and as will be clear from Figure 1, the tension of the belts may be varied by means of take-up screws 26 connected to adjustable bearings 27 which are slidably mounted in brackets 28 and 29 and support the shaft 24. A plurality of rollers 31 are mounted in the frame on horizontal bars 31a secured at 32 and 33 so as to provide a firm support for the upper reaches or plies of the belts when the shingles are carried thereon. In the present design of the apparatus, the belts are arranged for continuous movement by any suitable driving means for applying power to one of the supporting shafts for the belts.

In the operation of the receiving element, the top surface of the shingle-receiving element or elevator 6 will be dropped to a level below the upper reaches of the belts 17, 18 and 19 when the element assumes its lowermost position. In this way, as will be clear from Figure 3, the shingles will move from position on the receiving element to the belts and thereupon over the rollers 31 to the wrapping or other station as the case may be.

As will be seen from Figure 1, the shingles for stacking are delivered from the chute 11 and over an apron 34 in the frame to an open portion 36 at the top of the frame and thence deposited upon the receiving element 6 which is located directly beneath such open portion, or alternately upon an auxiliary receiving element as hereinafter described.

Means is provided for preventing the stacking of shingles upon the receiving element 6 after a predetermined number of shingles have been deposited thereon. Mounted for horizontal reciprocation upon a plurality of rollers 37 supported on guide tracks 38 and 39 in the frame, is an auxiliary receiving plate 40 arranged to move into and out of the area immediately below the open portion 36. The plate 40 is connected by means of a piston rod 41 to a pneumatic cylinder 42 secured in the frame by cross members 43, and such plate is actuated by the cylinder to move into shingle intercepting position as shown in Figure 3 when the receiving element 6 is being moved to a lowered position for removal of a completed stack therefrom. The plate 40 is allowed to remain in shingle intercepting position until the element 6 has been relieved of the shingles thereon and ascends to a point near its upper position. Thereupon the plate 40 is retracted toward the right in said Figure 3 and the shingles having been held against movement toward the right with said plate 40 by an adjustable, fixed thrust bar 44 which defines one side of the open portion 36 and has its lower edge above the plane of the plate.

Arranged at the side of the open portion 36 opposite to the apron 34 is a backing plate 46 which serves as a stop to halt the forward motion of the shingles in passing from the chute 11 and over the open portion. A jogger plate 47 is pivotally mounted on the frame as by a shaft 48, at the side of the portion 36 opposite to the thrust bar 44, and such shaft has fixed thereon a rocker arm 49 (see Figure 1) which is operatively associated with an actuator member 52 and moved in one direction by a piston rod 51 of a pneumatic cylinder forming part of such member, a spring 53 serving to urge the arm 49 to return position so as to provide for oscillation of the plate upon operation of the cylinder. In this manner the jogger plate will urge the shingles against the bar 44 and thus keep them in vertical alignment in the stack. In detail member 52 is of a construction similar to a number of other actuating members utilized in the present apparatus and which will be more specifically hereinafter described.

In order to prevent any dislodged granular particles of the shingles from being carried back by the auxiliary receiving plate 40, a flexible scraper 54 is secured to the thrust bar 44 and depends therefrom so as to engage the upper surface of the receiving plate as the latter is reciprocated thereunder. The plate 40 is provided on its upper face with wedge shaped portions at 56 in position to underlie the notches 10b of the shingles so as to support in raised position the shingle portions at the trailing edges of the slots while the portions at the leading edges of said slots are comparatively lower. Thus, the possibility of successive shingles striking the forward edges of the preceding shingle slots will be prevented. As will also be noted, the shoulders at the thicker edges of the portions 56 define recesses into which the granular particles may be received pending removal by the scraper 54.

Means are provided for operating and controlling the operation of the vertically and the horizontally movable shingle receiving members so as to coordinate their movements. As previously explained, the receiving element 6 is carried upon the piston rod 7 of the double-acting cylinder 8, and in the present embodiment the upward movement of the element is effected by oil pressure acting to raise the piston 4. Oil is supplied to the cylinder under the piston through a conduit 57 leading from an oil reservoir 58 and containing a check-valve 59 which prevents back-flow of oil to the reservoir. Withdrawal of oil from the cylinder 8 is arranged to be effected through a conduit 61 connected with the conduit 57 between the cylinder and check-valve and extending to the reservoir. A hand-control valve 62 is inserted in conduit 61 to regulate the rate of flow of the oil through the conduit.

Contained within the conduit 61 and interposed between the cylinder 8 and valve 62 is an automatic valve 63 which is operable periodically to control the return flow of oil from the cylinder 40 so as to hold the receiving element 6 momentarily in fixed position and then permit its descent as shingles are accumulated thereon. The valve is normally maintained in closed position by a pneumatic actuating member 64, and as will be understood, the receiving element, when in an elevated shingle-receiving position, is arranged to be lowered a distance equal to the thickness of a single shingle as each shingle is delivered thereto. Since the rate of flow through conduit 61 is determined by manual control valve 62, and as the duration of opening of automatic valve 63 is constant, as controlled by the movement of successive shingles down the chute 11, as hereinafter described, the amount of drop of the elevator for each shingle may be adjusted to adapt the apparatus in accordance with the thickness of the shingle to be stacked.

Figures 4, 10, 11, 12:
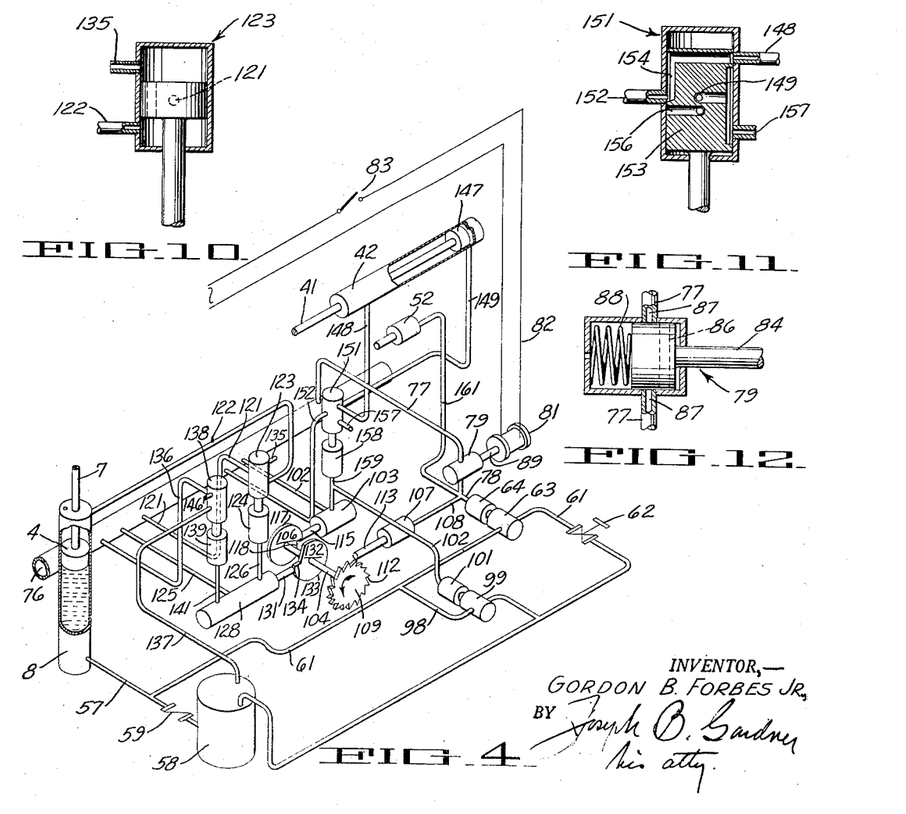
Figure 4 is a schematic perspective diagram illustrating the hydraulic-pneumatic power supply system and associated interlock controls.
Figures 8, 9, 10, 11 and 12 are longitudinal sectional views of various valves used for controlling the flow of fluid at various branches of the system.
Figure 7:
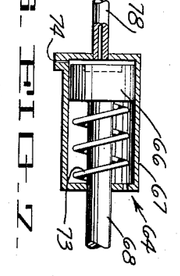
Figure 7 is a longitudinal sectional view of a typical actuating member employed in a number of instances in the control system.
Figure 8:
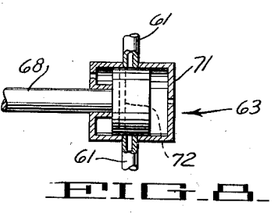
Figure 9:
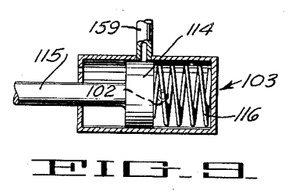

Means are therefore provided for actuating the member 64 so as to open the valve 63 as each shingle is delivered as aforesaid, the valve being opened at each instance sufficiently for permitting withdrawal of a quantity of oil from cylinder 8 as necessary to allow the receiving element to descend by gravity the desired distance. Any suitable type of valve 63 and actuating member 64 may be employed. As shown in Figures 7 and 8, the actuator 64 is similar to member 52 previously referred to and includes a plunger 66 mounted in a cylinder 67 and having attached thereto a rod 68 which serves as the valve stem for the valve 63. When the rod 68 is moved to the left in Figure 8, the valve closes the passage through the conduit 61. The rod 68 is normally retained by a spring 73, in a position with the valve passage 72 in a closed position, actuation of the plunger to open the valve passage 72 being arranged to be effected by introduction of air under pressure to cylinder 67 to displace the spring-pressed plunger from valve closing position whenever a shingle is delivered to the receiving element. Quick return of the plunger to valve closing position when admission of air to cylinder 67 is stopped, is facilitated by provision of a vent 74 in the cylinder wall. Air at appropriate pressure for operating the actuating member 64 is furnished from a source of supply here shown in the form of an air manifold 76 which is connected with the member by means of a primary conduit 77 and a branch conduit 78. Means for the release of air from the manifold and through conduits 77 and 78 for effecting actuation of member 64 as well as other actuating members utilized in the operation and control of the receiving units 6 and 40 and to be hereinafter described, is here shown in the form of a main control valve 79 and a solenoid 81 operatively connected with the valve and arranged in an electric circuit 82, the latter containing a micro-switch 83 whose operation is effected by passage of a shingle over the apron 34. Valve 79 as will be clear from Figure 12 is provided with a stem 84 having a passage 86 and movable to position the passage into or out of registration with openings 87 communicating with conduit 77. Valve 79 is normally kept in closed position by means of a spring 88 which holds the stem in a position wherein passage 86 is out of communication with conduit 77. The stem 84 is connected directly with the armature 89 of the solenoid and as will be clear, when the latter is energized, the armature will move the stem against resistance of spring 88, to place the valve in open position.

As will be seen from Figures 1 and 3, switch 83 is enclosed in a housing 90 which is mounted on the frame 5 by means of a bracket 91 and is positioned immediately above and spaced from the apron 34 so that the shingles will pass directly thereunder. The switch is normally maintained in open position so as to keep the circuit 82 open and the solenoid 81 de-energized. Associated with the switch is a lever 92 for actuating the switch, and means are provided for causing the lever to momentarily close the switch as each shingle passes over the apron. Provided in the apron is an air orifice 93 from which a stream of air is arranged to be continuously emitted and is so positioned that the air stream will be directed against one arm 94 of the lever 92. An opening 95 is provided in the bottom wall of the switch housing in order to permit passage of the stream of air from orifice to the lever. The lever is mounted on a pin 96 for oscillation about a horizontal axis and the latter is so positioned in respect to the lever that the arm aforesaid is unbalanced and will assume a declined position as illustrated in Figure 3. In the latter position, the other arm 97 of the lever will be elevated to contact and close the switch. However due to the force of the air stream impinging on arm 94, the lever as will be seen in Figure 2, will be maintained out of contact with the switch and the latter will be kept in open position as long as the air stream is permitted to impinge on the arm. The shingles, as will be understood, are arranged to be fed along the delivery chute and over the apron in longitudinally spaced relation. In this manner as the shingles successively pass over the apron, each shingle will in turn momentarily block off the stream issuing from orifice 93 and thereby allow the lever to engage and close the switch during such interval. It will be intermittently closed and opened as long as shingles are being delivered from the chute to the opening 36 and no actuation of the solenoid 81 will be effected unless shingles are being so delivered.

As previously explained, when a predetermined number of shingles have been stacked upon the receiving element 6, the receiving element will be allowed to descend to its bottom position for transfer of the shingle stack to the conveyor 16. In order to accelerate such downward movement of the element so that auxiliary plate 49 may be interposed in the opening 36 in time to intercept the succeeding shingles, means are provided for rapidly draining the oil below the piston 4 when the element has had the desired number of shingles accumulated thereon. In the present embodiment the quick drain of the oil is permitted by allowing the oil in conduit 61 to be by-passed around the valve 63 through a conduit 98 whereby the oil from the cylinder 8 may return directly into the reservoir 58. Flow of oil through conduit 98 is controlled by an automatic valve 99 normally assuming a closed position so that flow of oil through conduit 98 is prevented. Valve 99 is similar in construction and operation to valve 63, and the opening of valve 99 is effected by an air-operated actuator member 101 which is similar to actuator 64 and supplied with air through conduit sections 102 communicating with the manifold 76 and having operatively connected therebetween a valve 103 for controlling the flow of air therethrough. Valve 103 is arranged to be normally held in closed position but opened from the time the full stack of shingles has been accumulated on element 6 until the latter has reached its bottom position.

The operation of valve 103 is arranged to be controlled by the operation of the main control valve 79 and as here shown the operative connection between these valves comprises a shaft 104 arranged to be rotated intermittently on actuation of valve 79 and having a cam 106 fixed thereon and designed whereby in certain positions of shaft 104 the valve 103 will be moved to open position so as in turn to provide for opening of valve 99. For rotating shaft 104 there is associated therewith an air-operated actuating member 107 similar to actuator 64 and having air communication with valve 79 by means of a conduit 108. Fixed on shaft 104 is a ratchet wheel 109 whose peripheral teeth 112 are positioned for engagement by a rod 113 which is reciprocated on actuation of member 107. The wheel 109 will be rotated upon each actuation of member 107 a distance equal to the peripheral spacing of the teeth, and the number of the teeth on the wheel corresponds to the number of shingles to be accumulated on the element 6 before transfer of the stack is made from the element to conveyor 16. Valve 103 is provided with a valve-piston 114 which may be moved to open or close the passage through the valve by means of a push-rod 115 attached to the piston and arranged to engage the periphery of the cam. The rod is resiliently urged to an extended position by a spring 116 and when in such position said valve 103 will be open for admitting air from the manifold 76 to the conduit 159. On the other hand when the rod is in a retracted position, the valve will be held closed. The cam 106 is formed with an outer peripheral portion 117 which will normally keep the rod retracted. As will be seen from Figure 4 there is provided in the cam periphery a recessed portion 118 in which the rod may assume its extended position so as to open the valve, and such portion is so formed and positioned on the cam and related to the wheel 109, that the recess will be presented to the rod 115 when the final shingle for the stack has been deposited on the element. As will be evident the recess will be designed so as to keep the valve 103 in open position for the interval required for the element to descend to its bottom position and transfer its load to the conveyor belts. As soon as the recess leaves the rod, the valves 103 and 99 will be returned to closed position and the flow of oil through by-pass conduit 98 prevented.

Figure 5:
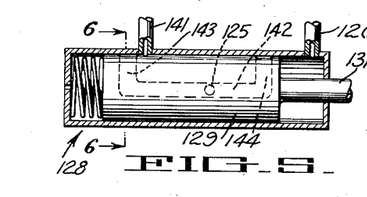
Figure 5 is a longitudinal sectional view of a dual valve used in the control system of the apparatus.
Figure 6:
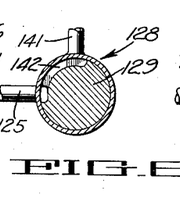
Figure 6 is a cross-sectional view of the dual valve aforesaid taken substantially along the plane indicated by line 6—6 of Figure 5.

Means are provided for forcibly urging the shingle receiving element downwardly while the valve 99 is open so as to increase the speed of descent of the element at the time. As here shown such means involves the application of increased air pressure in the cylinder 8 above piston 4. Connecting the air manifold 76 with the cylinder 8 at the upper end thereof are conduit sections 121 and 122, having a valve 123 operatively interposed therebetween. Valve 123 is normally held in closed position but may be opened by an air-operated actuator 124 whereby the cylinder may be placed in communication with the manifold. Air pressure for operating actuator 124 which is also similar in construction to actuator 64, is obtained from manifold 76 by means of conduit sections 125 and 126, and control of the flow of air therethrough is effected by means of a dual valve member 128 connecting such sections. Valve member 128 as shown in Figures 5 and 6 has mounted therein a piston 129 having an operating rod 131 attached thereto and by means of which the piston may be reciprocated to open or close the passage through the sections. Valve-piston 129 is spring-pressed to hold the same in a position permitting flow of air to the actuator, but the piston is arranged to be retained in a position preventing such flow, by means of a cam 132 fixedly mounted similar to cam 106 on shaft 104. The rod 131 is arranged to be maintained in engagement with the cam 132 and holds the piston in the closed or open positions aforesaid respectively as the rod is in contact with the extended or recessed peripheral portions 133 and 134 of the cam. As will be understood the recessed portion 134 is so formed and related in position to ratchet wheel 109 and cam 106 that the piston will permit air to flow to actuator 124 from the time the elevator element 6 receives its full accumulation of shingles to the time it reaches its bottom position. In other words, the rods 115 and 131 will simultaneously engage in the respective cam recesses so that removal of the liquid from the hydraulic side of cylinder 8 and input of compressed air in the pneumatic side will occur at the same time. If desired the cam recess 134 may be formed to permit actuation of member 124 and the opening of valve 123 for the period during which the shingles are being accumulated on the element 6 in addition to the period immediately after the accumulation has been completed.

When the supply of compressed air to actuator 124 is cut off by valve 128, the valve 123 will be positioned to establish flow communication between conduit 121 and a relief port 135 provided in valve 123. As will be clear from Figure 5, only when the rod 131 is in fully extended position will the compressed air from conduit 125 be permitted to flow into the actuator conduit 126 so as to cause valve 123 to open the passage of compressed air to cylinder 8. In this manner shortly after the rod 131 begins to move out of cam recess 134 the pneumatic side of cylinder 8 will again be vented.

Transfer of the stack of shingles from the receiver 6 to the conveyor shall have occurred by the time the rod 131 is on its way out of cam recess 134 and has effected the venting of the pneumatic side of cylinder 8, and means are provided for thereupon causing the receiver element 6 to immediately move upward to its top position. In the present embodiment the raising of the element is effected by forcing compressed air from manifold 76 to the oil reservoir 58 so that the oil will be forced therefrom into the bottom portion of cylinder 8 by way of conduit 57. As previously mentioned, valve 128 is of a dual functioning type and as here shown this valve is utilized for controlling the admission of the compressed air to the oil reservoir. Connecting the latter with air manifold 76, are conduit sections 136 and 137 having operatively interposed therebetween a valve 138 which is arranged to be maintained in closed position except when the receiving element is to be raised. Valve 138 is of a type similar to valve 123 and is connected to an air-operated actuating member 139 which is of the same construction as member 124, for operation by member 139 in substantially the same manner as actuating member 124 operates valve 123. Actuating member 139 is also designed for operation by valve 128 and is connected thereto by a conduit 141, but operation of the member for moving valve 138 to open the passage of compressed air to reservoir 58 is permitted only after the piston in valve 123 has been moved downwardly to provide for venting of the pneumatic side of cylinder 8 through port 135. As will be seen by reference to Figure 5, the piston 129 in valve 128 is formed with a longitudinal passage 142 which is at all times in communication with conduit 125 and is provided with branches 143 and 144 arranged for registration with conduits 141 and 126 respectively. Branch 144 is positioned to register with conduit 126 when the push-rod 131 has been fully extended, while on the other hand branch 143 is arranged to register with conduit 141 to permit flow of compressed air to actuate member 139, it being noted that the rod 131 is arranged to be moved to extended position in a rapid manner so that very little air will pass into conduit 141 during such movement, whereby effective flow of air to conduit 141 will be allowed only when the rod 131 is being returned at its relatively slow speed to its retracted position. Thus, assuming that the retraction of the push rod has been initiated whereby the flow of compressed air to the cylinder 8 has been cut off and the cylinder is in communication with relief port 135, the further retraction of the push rod will place branch 143 in registration with conduit 141 whereby actuation of member 139 will be effected and valve 138 thereby moved to open position and establishing communication between the air manifold 76 and reservoir 58. By the time the retraction of the push rod has progressed to move the branch 143 out of registration with conduit 141, the elevator element 6 shall have been fully raised by means of the oil pneumatically forced through conduit 57 from the reservoir to the cylinder. As the valve 138 is returned to its normal position, the supply of compressed air to the reservoir will be stopped, but due to the presence of check-valve 59 in conduit 57, the element 6 will be held in position subject to the intermittent lowering thereof as governed by the operation of valves 63 and 99 as heretofore explained. It may be mentioned at this time, that valve 138, like valve 123, is provided with an air relief port 146 which will be in communication with conduit 137 so as to normally provide a vent for reservoir 58.

As will be recalled, the auxiliary shingle-receiving plate 40 is arranged to be moved into and out of the area below the receiving opening 36 while the elevator element 6 is being dropped with the full load of shingles to its bottom position and then returned to its upper position for accumulating a new stack of shingles. The means for effecting the movement of the plate 40 and its operation at the proper time is, in the present form of the invention, incorporated with the control apparatus previously set forth. The cylinder 42 which is associated with the plate 40 has contained therein a piston 147 to which is connected the piston rod 43 attached to the plate. Compressed air to the cylinder at opposite ends of the piston is arranged to be alternately admitted to the cylinder through conduits 148 and 149 operatively connected to a valve 151. A conduit 152 connects valve 151 with manifold 76. As shown in Figure 11, there is mounted within valve 151 a slidable valve member 153 having ports 154 and 156 which upon reciprocation of the member will be alternately brought into registration with conduit 152 so that compressed air will be delivered successively to conduits 148 and 149. Conduit 149 is connected to the rear end of cylinder 42 so that upon admission of air to said conduit the plate 40 will be advanced to the shingle intercepting position as illustrated in Figure 3. Conduit 148 is connected to the forward end of cylinder 42 whereby on admission of air to this conduit the plate will be retracted to a rear position, as seen in Figure 2, out of the path of the shingles dropping through opening 36. Alternate venting of each end of the cylinder for relieving the pressure in one end when compressed air is being admitted to the other end, is afforded by a relief port 157 which alternately communicates with conduits 148 and 149 when the valve member 153 is reciprocated.

Operation of valve 151 is arranged to be effected by an actuator 158 which is also of the same type as actuator 64 and normally holds the valve member 153 in a position wherein the forward end of cylinder 42 will be in communication with the compressed air manifold and the rear end vented to the atmosphere. Actuator 158 is operatively connected with cam-actuated valve 103, and as shown in Figure 4, is in flow communication with conduit 102 by means of an extension 159. It will thus be seen that when valve 103 is moved to effect actuation and opening of oil by-pass valve 99, the actuator 158 will be motivated to move the valve member 153 so that the cylinder at the forward end of piston 147 will be vented while the rear end will be supplied with compressed air. In this way, as the receiving element 6 with its full load is moved down for transferring the shingles to the conveyor, the auxiliary receiving plate 40 will be thrust into shingle receiving position. Correspondingly, when the valve 103 is returned to the position wherein the pressure is relieved in conduit 102, the receiving plate 40 will be instantly withdrawn to its retracted position.

Desirably, the jogger actuator cylinder 52 is operatively connected in the control system aforesaid, and in order that the jogger plate will move against each shingle as the same is received in the opening 36, the actuator 52 is connected by means of a conduit 161 with the main control valve 79.

In order to facilitate inspection and service of the control system, the various parts thereof are grouped in a small space and in order to shield the parts from gravel falling from the shingles, a housing 162 is provided for enclosing such parts, the different conduits connected to the operating members of the apparatus being led to the housing and operatively attached to the appropriate parts of the system.

The operation of the apparatus is as follows:

As each shingle passes over the apron 34 to the receiving opening 36, the air stream from orifice 93 will be blocked off so that lever 92 will close micro-switch 83. Solenoid 81 will thereupon move the main control-valve 79 whereby all three actuators 64, 107, and 52 will be simultaneously operated assuming elevator element 6 to be in shingle receiving position and plate 40 retracted; this operation causes valve 63 to open line 61 sufficiently to drop the receiving element the thickness of one shingle, ratchet wheel 109 will be rotated the distance of one tooth, and the jogger plate will be moved to engage and align the shingle at the top of the elevator element. These actions are of course repeated with each closure of the switch and when ratchet wheel 109 has been rotated to a position wherein the rods 115 and 131 enter recesses 118 and 134, valve 103 will be opened to actuate members 101 and 158, and valve 128 will be moved to actuate member 124. As a result of the foregoing, valve 99 will open by-pass conduit 98, valve 151 will admit compressed air to the rear of cylinder 42, and valve 123 will admit compressed air to the top of cylinder 8. It will thus be seen that elevator element 6 will be dropped with the stack to its bottom position and the auxiliary receiving plate 40 simultaneously thrust into position over the element. The element 6 will remain in its bottom position long enough for the bundle of shingles deposited on the belts to clear the grid support members and until the switch 83 has been operated enough times to effect rotation of cam 132 to the point where rod 131 will be retracted so as to cause actuation of member 139 and the resultant operation of valve 128 to force the compressed air into the oil reservoir and the venting of the pneumatic side of cylinder 8. As a result of the later operations the element 6 will be moved to its upper position for again receiving the shingles. At the same time, however, rod 115 is forced out of cam recess 118 so that valve 103 will be opened and member 158 actuated to place valve 151 in the position causing venting of the rear end of cylinder 42 and admission of compressed air to the forward end so as to move receiving plate 40 quickly from its position over receiving element 6. As the plate 40 is being retracted, the shingles accumulated thereon are prevented from moving with the plate by the presence of the thrust bar 44, and in this manner when the plate has been fully retracted said shingles will be dropped upon the element 6 now in about its top position and the oncoming shingles entering the opening 36 will be deposited directly on the stack as now supported on said element 6. A new cycle of the aforementioned operations is then begun.

It will now be evident that with the apparatus of the present invention the operation will be controlled by the rapidity with which the shingles are fed to the apparatus. This permits a very high speed operation and output of stacked articles. At the same time a positive control of the number of shingles in each stack delivered will be guaranteed. It is also important to note that with the use of the apparatus of the invention, there is minimum danger of the granular particles separating from the body of the shingles, or of the shingles being torn, bent, or otherwise damaged during their passage through the apparatus. In this connection it will be seen that only a relatively short drop of the shingle is necessary from the feeding chute to the auxiliary plate, and from the latter to the elevator element. Furthermore, the stacking of the shingles will be effected with all shingles placed in alignment, and such alignment will be maintained in the transfer of the shingles from each successive station to the next.

I claim:

1. In an apparatus for counting and stacking shingles, the combination of a plurality of conveyors arranged side by side in spaced relationship to each other adapted to support a stack of shingles for movement horizontally thereby, shingle supporting members arranged oppositely with respect to each other between said conveyors, means for giving said shingle supporting members reciprocating vertical movements, means for providing a stack of shingles on said supporting members during a portion of their downward movement so as to be deposited on said conveyors upon their continued downward movement, hydraulic means to effect an accelerated downward movement of the shingle-supporting members between an intermediate and lowermost position of their movement, and control means actuated by the passage of a prescribed number of shingles being deposited upon said supporting members for effecting operation of said hydraulic means.

2. In an apparatus for counting and stacking shingles, the combination of a plurality of conveyors arranged side by side in spaced relationship to each other adapted to support a stack of shingles for movement horizontally thereby, a bar extending across below said conveyors, a plurality of vertically elongated grid members mounted on said bar between said conveyors with their upper faces in alignment, means for giving said bar and said grid members reciprocating vertical movements, means for providing a stack of shingles on said grid members during a portion of their downward movement so as to deposit said shingles on said conveyors upon continued downward movement of the grid members, hydraulic means to effect an accelerated downward movement of the shingle-supporting members between an intermediate and lowermost position of their movement, and control means actuated by the passage of a prescribed number of shingles being deposited upon said supporting members for effecting operation of said hydraulic means.

3. In an apparatus for counting and stacking shingles, the combination of a plurality of conveyors arranged side by side in spaced relationship to each other adapted to support a stack of shingles for movement horizontally thereby, a bar extending across below said conveyors, a plurality of heavy plates mounted on edge on said bar between said conveyors with their upper edge faces in alignment with each other, fluid pressure operated means positioned below said bar and adapted to give said bar and said plates reciprocating vertical movements, means for providing a stack of shingles on said plates during a portion of their downward movement so as to deposit said shingles on said conveyors upon continued downward movement of said plates with said bar, hydraulic means to effect an accelerated movement of said bar and plates between an intermediate position and their lowermost position of movement so as to deposit the stack of shingles on said conveyors, means including a toothed wheel having a number of teeth corresponding to the desired number of shingles in a stack operatively connected to said hydraulic means whereby the latter will be actuated upon one complete revolution of said wheel, and means for rotating said wheel a distance of one tooth as each shingle is deposited on said plates.

4. In an apparatus for counting and stacking shingles, the combination of a plurality of conveyors of the endless belt type arranged side by side in spaced relationship to each other so as to support a stack of shingles for movement horizontally thereby, shingle supporting members arranged oppositely with respect to each other between said conveyors, means for giving said shingle supporting members reciprocating movements, means for providing a stack of shingles on said supporting members during a portion of their downward movement so as to be deposited on said conveyors upon their continued movement downwardly, means to effect an accelerated movement of said supporting members between an intermediate position and lowermost position of movement so as to deposit the stack of shingles on said conveyors, and control means for actuating said acceleration means, said control means being actuated after accumulation of a prescribed number of shingles in said stack.

5. In an article counting and stacking apparatus, a frame having means thereon defining an article-receiving opening, means on said frame for conducting a succession of articles along a substantially linear delivery path toward and into said opening, a vertically-reciprocable article-receiving element positioned underneath said opening for accumulating a stack composed of successive articles received in said opening, a conveyor extending from under said opening and arranged to receive an accumulated stack of articles from said element when the latter is in a lowermost posiiton of its movement, means operative to effect intermittent downward movement of said article-receiving element from an uppermost position of its movement so as to periodically maintain the top of the stack slightly below the plane of the delivery path of said articles, hydraulic means operative after accumulation of a prescribed number of articles in said stack to effect an accelerated movement of the receiving element between an intermediate position and said lowermost position of its movement so as to deposit the stack of articles on said conveyor, and control means actuated by the passage of shingles along said delivery path operatively connected to said hydraulic means.

6. In an article counting and stacking apparatus, a frame having means thereon defining an article-receiving opening, means on said frame for conducting a succesion of articles along a substantially linear delivery path toward and into said opening, a vertically-reciprocable article-receiving element positioned underneath said opening for accumulating a stack composed of successive articles received in said opening, a conveyor extending from under said opening and arranged to receive an accumulated stack of articles from said element when the latter is in a lowermost position of its movement, means operable by movement of said articles along the delivery path thereof for controlling and effecting an intermittent downward movement of said article-receiving element from an uppermost position of its movement so as to periodically maintain the top of the stack in effective receiving position below the plane of the delivery path of said articles, hydraulic means operative after accumulation of a prescribed number of articles in said stack to effect an accelerated movement of the receiving element between an intermediate position and said lowermost position of its movement so as to deposit the stack of articles on said conveyor, and a shingle actuated control mechanism for effecting operation of said hydraulic means.

7. In an article counting and stacking apparatus, a frame having means thereon defining an article-receiving opening, means on said frame for conducting a succession of articles along a substantially linearly unobstructed delivery path toward and into said opening, a vertically-reciprocable article-receiving element positioned underneath said opening for accumulating a stack composed of successive articles received in said opening, a conveyor extending from under said opening and arranged to receive an accumulated stack of articles from said element when the latter is in a lowermost position of its movement, control mechanism operable by and upon passage of successive articles past a point in said delivery path for effecting vertical alignment of the articles in said stack and for actuating apparatus effecting intermittent downward movement of said article-receiving element from an uppermost position of its movement so as to periodically maintain the top of the stack in substantial registry with the plane of the delivery path of said articles, hydraulic means operative after accumulation of a prescribed number of articles in said stack to effect an accelerated movement of the receiving element between an intermittent position and said lowermost position of its movement so as to deposit the stack of articles on said conveyor, shingle counting means operatively connected to said hydraulic means, and means movable under said opening coincidently with institution of accelerated movement of said article-receiving element for intercepting a series of delivered articles while said stack is being deposited on said conveyor and for transferring said series of articles to the article-receiving element after deposit of the stack on said conveyor.

8. In an article counting and stacking apparatus, a frame having means thereon defining an article-receiving opening, means on said frame for conducting a succession of articles along a substantially linearly unobstructed delivery path toward and into said opening, a vertically - reciprocable article - receiving element positioned underneath said opening for accumulating a stack composed of successive articles received in said opening, a conveyor extending from under said opening and arranged to receive an accumulated stack of articles from said element when the latter is in a lowermost position of its movement, control mechanism operable by and upon passage of successive articles past a point in said delivery path and including means interposed in the delivery path and engageable by successive articles as the later move along said path for effecting vertical alignment of the articles in said stack and for actuating apparatus effecting intermittent downward movement of said article-receiving element from an uppermost position of its movement so as to periodically maintain the top of the stack slightly below the plane of the delivery path of said articles, hydraulic means operative after accumulation of a prescribed number of articles in said stack to effect an accelerated movement of the receiving element between an intermediate position and said lowermost position of its movement so as to deposit the stack of articles on said conveyor, a ratchet mechanism actuated by the passage of said shingles and operatively connected to said hydraulic means for operating the latter, and means movable under said opening coincidently with institution of accelerated movement of said article-receiving element for intercepting a series of delivered articles while said stack is being deposited on said conveyor and for transferring said series of articles to the article-receiving element after deposit of the stack on said conveyor.

9. In an article counting and stacking apparatus, a frame having means thereon defining an article-receiving opening, means on said frame for conducting a succession of articles along a substantially linearly unobstructed delivery path toward and into said opening, a vertically-reciprocable article-receiving element positioned underneath said opening for accumulating a stack composed of successive articles received in said opening, a conveyor extending from under said opening and arranged to receive an accumulated stack of articles from said element when the latter is in a lowermost position of its movement, control mechanism operable by and upon passage of successive articles past a point in said delivery path and including means interposed in the delivery path and engageable by successive articles as the latter move along said path, said control mechanism being arranged to effect intermittent downward movement of said article-receiving element from an uppermost position of its movement in increments substantially corresponding to corresponding vertical dimensions of successive articles, and thus periodically maintain the top of the stack in substantial registry with the plane of the delivery path of said articles, hydraulic means operative after accumulation of a prescribed number of articles in said stack to effect an accelerated movement of the receiving element between an intermediate position and said lowermost position of its movement so as to deposit the stack of articles on said conveyor, and a shingle actuated control device for causing said hydraulic means to operate.

10. In an article counting and stacking apparatus, a frame having therein an article-receiving opening defined by relatively fixed side and end stop members and a jogger side member spaced from the fixed side member and movable toward and from the latter, means on said frame for conducting a succession of articles along a substantially linear delivery path into said opening and into engagement with the end stop member, a vertically reciprocable article-receiving element positioned underneath said opening for accumulating a stack composed of successive articles received in said opening, said stack being maintained in perpendicular relation with respect to the article-receiving element primarily by impingement of the articles against the end stop member and secondarily by movement of the articles by the movable jogger side member into engagement with the fixed side stop member, a conveyor extending from position underneath said opening and arranged to receive an accumulated stack of articles from said element when the latter is in a lowered position, means responsive to movement of successive articles into said opening for lowering said element and stack in increments for keeping the stack slightly below said delivery path, hydraulic means for governing the distance through which the element and stack are lowered in said increments to accumulate a stack comprising a prescribed number of articles and for further accelerating the element and stack through a sustained lowering movement to deposit the stack on said conveyor and to continue movement of the element upwardly toward a position substantially coinciding with said delivery path, control means actuated by movement of shingles toward said stack for effecting operation of said hydraulic means, said governing means further actuating mechanism for intercepting articles delivered into said opening after completion of a stack on said element and prior to the return of the receiving element to receiving position, and said intercepting means during upward movement of the element being operative to deposit on the latter said intercepted articles.

11. In an article counting and stacking apparatus, a frame having therein an article-receiving opening defined by relatively fixed side and end stop members and a jogger side member spaced from the fixed side member and movable toward and from the latter, means on said frame for conducting a succession of articles along a substantially linear delivery path into said opening and into engagement with the end stop member, a vertically reciprocable article-receiving element positioned underneath said opening for accumulating a stack composed of successive articles received in said opening, said stack being maintained in perpendicular relation with respect to the article-receiving element primarily by impingement of the articles against the end stop member and secondarily by movement of the articles by the movable jogger side member into engagement with the fixed side stop member, a conveyor extending from position underneath said opening and arranged to receive an accumulated stack of articles from said element when the latter is in a lowered position, support means for said element comprising a cyclically movable component and including a control circuit operable to govern movement of said component and element, means connected in said circuit responsive to movement of successive articles into said opening for actuating said movable component so as to lower said element and stack in increments for keeping the stack slightly below said delivery path, means for governing the distance through which the element and stack are lowered in said increments to accumulate a stack comprising a prescribed number of articles, separate control means operable by said control circuit actuating means when a stack of articles of predetermined size has been accumulated on said article-receiving element for accelerating the element and stack through a sustained lowering movement to deposit the stack on said conveyor and to continue movement of the element upwardly toward a position substantially coinciding with said delivery path, said governing means further actuating mechanism for intercepting articles delivered into said opening after completion of a stack on said element and prior to delivery of the stack to said conveyor, and said intercepting means being operative to deposit said intercepted articles on said element in its elevated position slightly below the delivery path of said articles.

12. Apparatus as described in claim 11 wherein the article intercepting mechanism is disposed to operate in a plane immediately subjacent said delivery path whereby during sustained downward movement of the article-receiving element and the stack to deposit the latter on the conveyor, the articles accumulated by said intercepting mechanism will be required to make a minimized vertical drop from the plane of said delivery path.

13. In an article counting and stacking apparatus, a frame having therein an article-receiving opening defined by relatively fixed side and end stop members and a jogger side member spaced from the fixed side member and movable toward and from the latter, means on said frame for conducting a succession of articles along a substantially linear delivery path into said opening and into engagement with the end stop member, a vertically reciprocable article-receiving element positioned underneath said opening for accumulating a stack composed of successive articles received in said opening, said stack being maintained in perpendicular relation with respect to the article-receiving element primarily by impingement of the articles against the end stop member and secondarily by movement of the articles by the movable jogger side member into engagement with the fixed side stop member, a conveyor extending from position underneath said opening and arranged to receive an accumulated stack of articles from said element when the latter is in a lowered position, support means for said article-receiving element comprising an extensible and retractible member connected with said element and movable therewith between the limits of travel of the element, movable means engaging said extensible and retractible member for controlling movement of the latter between said limits of travel, control means for regulating degrees of movement of said movable controlling means, means responsive to movement of successive articles along said delivery path for impulsively actuating said control means to retract said member and its connected article-receiving element in increments for keeping the stack slightly below said delivery path, means operative in sequence with the retraction of said member to prescribe the number of impulses imparted to the member so as to govern the number of articles accumulated in said stack, means operative at the end of a series of impulses for effecting a sustained accelerated retraction of said retractible member to rapidly move the stack toward and for deposit on said conveyor and for effecting a further sustained accelerated extension of the member toward an initial starting point immediately subjacent the delivery path of said articles, and mechanism operable during the accelerated retractive movement of said article-receiving element for intercepting articles in excess of the number thereof prescribed to complete a stack which are delivered into said opening and for depositing the intercepted articles on the article-receiving element during movement of the latter toward said initial starting point.

14. In an article counting and stacking apparatus, a frame having therein an article-receiving opening defined by relatively fixed side and end stop members and a jogger side member spaced from the fixed side member and movable toward and from the latter, means on said frame for conducting a succession of articles along a substantially linear delivery path into said opening and into engagement with the end stop member, a vertically reciprocable article-receiving element positioned underneath said opening for accumulating a stack composed of successive articles received in said opening, said stack being maintained in perpendicular relation with respect to the article-receiving element primarily by impingement of the articles against the end stop member and secondarily by movement of the articles by the movable jogger side member into engagement with the fixed side member, a conveyor extending from position underneath said opening and arranged to receive an accumulated stack of articles from said element when the latter is in a lowered position, support means for said article-receiving element comprising an extensible and retractible member connected with said element and movable therewith between the limits of travel of the element, movable means engaging said extensible and retractible member for controlling movement of the latter between said limits of travel, control means for regulating degrees of movement of said movable controlling means, means responsive to movement of successive articles along said delivery path for impulsively actuating said control means to retract said member and its connected article-receiving element for keeping the top face of the stack slightly below said delivery path, counter mechanism movable through an operative cycle in correspondence with the retraction of said member so as to prescribe the number of impulses imparted to the member in order to govern the number of articles accumulated in said stack, control mechanism operative in sequence with the series of impulses for instituting a sustained accelerated movement of the article-receiving element and the stack thereon away from the delivery path so as to deposit said stack on the conveyor and for further instituting sustained reverse movement of the article-receiving element toward an initial starting point immediately subjacent the plane of the delivery path of said articles, and mechanism operative in an interval between deliveries of successive articles into said opening and during the accelerated retractive movement of said article-receiving element and including means movable under said opening for intercepting the first delivered articles of the succeeding stack, said intercepting mechanism being operative in an interval between deliveries of articles into said opening to withdraw from under said opening and to deposit the intercepted articles on the article-receiving element when located at about its uppermost position.

15. In an article counting and stacking apparatus, a frame having therein an article-receiving opening defined by relatively fixed side and end stop members and a jogger side member spaced from the fixed side member and movable from the latter, means on said frame for conducting a succession of articles along a substantially linear delivery path into said opening and into engagement with the end stop member, a vertically reciprocable article-receiving element positioned underneath said opening for accumulating a stack composed of successive articles received in said opening, said stack being maintained in perpendicular relation with respect to the article-receiving element primarily by impingement of the articles against the end stop member and secondarily by movement of the article by the movable jogger side member into engagement with the fixed side stop member, a conveyor extending from position underneath said opening and arranged to receive an accumulated stack of articles from said element when the latter is in a lowered position, a cylinder and ducts associated with said receiving element comprising a fluid circuit, a piston in said cylinder connected with said article-receiving element for movement therewith and responsive to the pressure in the cylinder for controlling movement of the article-receiving element between limits of travel, control means for regulating movement of fluid in said circuit, means responsive to movement of successive articles along said delivery path for impulsively displacing successive quantities of fluid in said circuit to correspondingly move the piston and to retract said article-receiving element in increments corresponding with a selected dimension of each article, counter mechanism operative in sequence with the retraction of said element to prescribe the number of impulses imparted to said piston so as to govern the number of articles accumulated in said stack, means actuated at the end of a series of impulses for effecting a sustained flow of fluid in said circuit to rapidly move the piston and the article-receiving element and the stack of articles thereon toward the conveyor so as to deposit thereon said stack of articles, said means further effecting sustained reverse movement of said article-receiving element toward an initial starting point immediately subjacent the delivery path of said articles, and mechanism operable during the accelerated movements of said article-receiving element for intercepting articles in excess of the number thereof prescribed to complete a stack which are delivered into said opening and for depositing the intercepted articles on the article-receiving element after at least a substantial part of the movement of the latter toward said initial starting point.

16. In an article counting and stacking apparatus, a frame having therein an article-receiving opening defined by relatively fixed side and end stop members and a jogger side member spaced from the fixed side member and movable toward and from the latter, means on said frame for conducting a succession of articles along a substantially linear delivery path into said opening and into engagement with the end stop member, a vertically reciprocable article-receiving element positioned underneath said opening for accumulating a stack composed of successive articles received in said opening, said stack being maintained in perpendicular relation with respect to the article-receiving element primarily by impingement of the article against the end stop member and secondarily by movement of the articles by the movable jogger side member into engagement with the fixed side stop member, a conveyor extending from position underneath a said opening and arranged to receive an accumulated stack of articles from said element when the latter is in a lowered position, a cylinder and ducts associated with said receiving element comprising a fluid circuit, a piston in said cylinder connected with said article-receiving element for movement therewith and responsive to the pressure in the cylinder for controlling movement of the article-receiving element between limits of travel, control means for regulating movement of fluid in said circuit, means responsive to movement of successive articles along said delivery path for impulsively displacing successive quantities of fluid in said circuit to correspondingly move the piston and to retract said article-receiving element in increments for keeping said stack slightly below said delivery path, counter mechanism operative in sequence with the retraction of said element to prescribe the number of impulses imparted to said piston so as to govern the number of articles accumulated in said stack, means actuated at the end of a series of impulses for effecting a sustained flow of fluid in said circuit to rapidly move the piston and the article-receiving element and the stack of articles thereon toward the conveyor so as to deposit thereon said stack of articles, a source of fluid under pressure, means operative at the end of said sustained movement of the article-receiving element toward the conveyor for imposing fluid pressure from said source on the fluid in said circuit so as to effect a sustained reverse movement of said article-receiving element toward an initial starting point immediately subjacent the delivery path of said articles, and mechanism operable during the accelerated movements of said article-receiving element for intercepting articles in excess of the number thereof prescribed to complete a stack which are delivered into said opening and for depositing the intercepted articles on the article-receiving element after at least the major portion of the movement of the latter toward said initial starting point.

17. In an article counting and stacking apparatus, a frame having therein an article-receiving opening defined by relatively fixed side and end stop members and a jogger side member spaced from the fixed side member and movable toward and from the latter, means on said frame for conducting a succession of articles along a substantially linear delivery path into said opening and into engagement with the end stop member, a vertically reciprocable article-receiving element positioned underneath said opening for accumulating a stack composed of successive articles received in said opening, said stack being maintained in perpendicular relation with respect to the article-receiving element primarily by impingement of the articles against the end stop member and secondarily by movement of the articles by the movable jogger side member into engagement with the fixed side member, a conveyor extending from position underneath said opening and arranged to receive an accumulated stack of articles from said element when the latter is in a lowered position, a cylinder and ducts associated with said receiving element comprising a fluid circuit, a piston in said cylinder connected with said article-receiving element for movement therewith and responsive to the pressure in the cylinder for controlling movement of the article-receiving element between limits of travel, control means for regulating movement of fluid in said circuit, means responsive to movement of successive articles along said delivery path for impulsively displacing successive quantities of fluid in said circuit to correspondingly move the piston and to retract said article-receiving element in increments for keeping said stack slightly below said delivery path, counter mechanism operative in sequence with the retraction of said element to prescribe the number of impulses imparted to said piston so as to govern the number of articles accumulated in said stack, means actuated at the end of a series of impulses for effecting a sustained flow of fluid in said circuit to rapidly move the piston and the article-receiving element and the stack of articles thereon toward the conveyor so as to deposit thereon said stack of articles, a source of fluid under pressure, valving means controlled by said counter mechanism and operative at the end of said sustained movement of the article-receiving element toward the conveyor for admitting to said circuit pressure fluid from said source so as to effect a sustained rapid reverse movement of said article-receiving element toward an initial starting point immediately subjacent the delivery path of said articles, and a reciprocable member operable during the sustained movements of said article-receiving element to move under said article-receiving opening for intercepting articles in excess of the number thereof prescribed to complete a stack which are delivered into said opening and for depositing the intercepted articles on the article-receiving element by moving toward a side of said opening after at least a part of the movement of the latter toward said initial starting point.

18. In an article counting and stacking apparatus, a frame having therein an article-receiving opening defined by relatively fixed side and end stop members and a jogger side member spaced from the fixed side member and movable toward and from the latter, means on said frame for conducting a succession of articles along a substantially linear delivery path into said opening and into engagement with the end stop member, a vertically reciprocable article-receiving element positioned underneath said opening for accumulating a stack composed of successive articles received in said opening, said stack being maintained in perpendicular relation with respect to the article-receiving element primarily by impingement of the articles against the end stop member and secondarily by movement of the articles by the movable jogger side member into engagement with the fixed side stop member, a conveyor extending from position underneath said opening and arranged to receive an accumulated stack of articles from said element when the latter is in a lowered position, a cylinder and ducts associated with said receiving element comprising a fluid circuit, a piston in said cylinder connected with said article-receiving element for movement therewith and responsive to the pressure in the cylinder for controlling movement of the article-receiving element between limits of travel, control means for regulating movement of fluid in said circuit, including a valve responsive to movement of successive articles along said delivery path for moving measured amounts of fluid in said circuit so as to correspondingly move the piston and to retract the article-receiving element in increments corresponding with the vertical thickness of the article, counter mechanism operative in sequence with the retraction of said element to prescribe the number of impulses imparted to said piston so as to govern the number of articles accumulated in said stack, a second valve in said circuit operatively connected with said counter mechanism and actuated at the end of a series of impulses for conditioning the circuit to effect a sustained flow of fluid therein to rapidly move the piston and the article-receiving element and the stack of articles thereon toward the conveyor so as to deposit thereon said stack of articles, a source of fluid under pressure, a third valve operable by said counter mechanism subsequent to deposit of the stack of articles on said conveyor for admitting fluid under pressure from said source into said circuit so as to effect sustained and rapid reverse movement of said article-receiving element toward an initial starting point immediately subjacent the delivery path of said articles, and a reciprocable element arranged adjacent said opening, having means connected with said source of fluid under pressure and adapted to be actuated by said counter mechanism, said reciprocable element being movable under said article-receiving opening upon institution of sustained movement of the article-receiving element toward said conveyor for intercepting articles in excess of the number thereof prescribed to complete a stack which are delivered into the opening and for retraction from under said opening so as to deposit the intercepted articles on the article-receiving element when returned to its elevated position slightly below the delivery path of said articles.

19. In an article counting and stacking apparatus, a frame having therein an article-receiving opening defined by relatively fixed side and end stop members and a jogger side member spaced from the fixed side member and movable toward and from the latter, means on said frame for conducting a succession of articles along a substantially linear delivery path into said opening and into engagement with the end stop member, a vertically reciprocable article-receiving element positioned underneath said opening for accumulating a stack composed of successive articles received in said opening, said stack being maintained in perpendicular relation with respect to the article-receiving element primarily by impingement of the articles against the end stop member and secondarily by movement of the articles by the movable jogger side member into engagement with the fixed side stop member, a conveyor extending from position underneath said opening and arranged to receive an accumulated stack of articles from said element when the latter is in a lowered position, a cylinder and ducts associated with said receiving element comprising a fluid circuit, a piston in said cylinder connected with said article-receiving element for movement therewith and responsive to the pressure in the cylinder for controlling movement of the article-receiving element between limits of travel, control means for regulating movement of fluid in said circuit, means including a valve responsive to movement of successive articles along said delivery path for moving measured amounts of fluid in said circuit so as to correspondingly move the piston and to retract the article-receiving element in increments for keeping said stack at about the same distance below said delivery path, counter mechanism operative in sequence with the retraction of said element to prescribe the number of impulses imparted to said piston so as to govern the number of articles accumulated in said stack, a second valve in said circuit operatively connected with said counter mechanism bypassing said first valve, said second valve being actuated at the end of a series of impulses for conditioning the circuit to effect a sustained flow of fluid therein to rapidly move the piston and the article-receiving element and the stack of articles thereon toward the conveyor so as to deposit thereon said stack of articles, a source of fluid under pressure, a third valve operable by said counter mechanism subsequent to deposit of the stack of articles on said conveyor for admitting fluid under pressure from said source into said circuit so as to effect a reversal of flow of fluid in said circuit and to further effect sustained and rapid reverse movement of said article-receiving element toward an initial starting point immediately subjacent the delivery path of said articles, and a horizontally reciprocable element arranged adjacent said article-receiving opening, having means connected with said source of fluid under pressure and adapted to be actuated by said counter mechanism, said horizontally reciprocable element being movable under said opening upon institution of sustained movement of the article-receiving element toward said conveyor for intercepting articles in excess of the number thereof prescribed to complete a stack which are delivered into the opening and for retraction from under said opening so as to deposit the intercepted articles on the article-receiving element, said deposit of intercepted articles on the article-receiving element taking place closely adjacent to the delivery path of said articles.

20. In an article counting and stacking apparatus, a frame having means thereon defining an article-receiving opening, means on said frame for conducting a succession of articles along a substantially linear unobstructed delivery path toward and into said opening, a vertically-reciprocable article-receiving element positioned underneath said opening for accumulating a stack composed of successive articles received in said opening, a conveyor extending from under said opening and arranged to receive an accumulated stack of articles from said element when the latter is in a lowermost position of its movement, control mechanism operable by and upon passage of successive articles past a point in said delivery path for effecting vertical alignment of the articles in said stack and for actuating apparatus effecting intermittent downward movement of said article-receiving element from an uppermost position of its movement so as to periodically maintain the top of the stack in substantial registry with the plane of the delivery path of said articles, and means operative after accumulation of a prescribed number of articles in said stack to deposit the stack of articles on said conveyor, and means movable under said opening substantially with said deposit for intercepting a series of delivered articles while said stack is being deposited on said conveyor and for transferring said series of articles to the article-receiving element after deposit of the stack on said conveyor.

GORDON B. FORBES, Jr.

REFERENCES CITED

The following references are of record in the file of this patent:

UNITED STATES PATENTS

| Number | Name | Date |
|---|---|---|
| 1,569,032 | Reichel | Jan. 12, 1926 |
| 1,985,547 | Quick et al. | Dec. 25, 1934 |
| 2,005,906 | Pierce | June 25, 1935 |
| 2,228,887 | Peterson | Jan. 14, 1941 |